(12) United States Patent
Okuda et al.

(10) Patent No.: US 6,946,022 B2
(45) Date of Patent: Sep. 20, 2005

(54) SCRUBBER AND EXHAUST GAS TREATMENT APPARATUS

(75) Inventors: Kazutaka Okuda, Tokyo (JP); Kotaro Kawamura, Tokyo (JP)

(73) Assignee: Ebara Corporation, Tokyo (JP)

( * ) Notice: Subject to any disclaimer, the term of this patent is extended or adjusted under 35 U.S.C. 154(b) by 31 days.

(21) Appl. No.: 10/375,908

(22) Filed: Feb. 28, 2003

(65) Prior Publication Data

US 2003/0164560 A1 Sep. 4, 2003

(30) Foreign Application Priority Data

Mar. 1, 2002  (JP) ........................................ 2002-056006

(51) Int. Cl.[7] ................................................ B01F 3/04
(52) U.S. Cl. ............................ 96/281; 96/282; 96/358; 96/360; 261/90; 261/152
(58) Field of Search ........................... 96/266, 270, 281, 96/282, 285, 286, 314, 319, 320, 355, 358, 360; 261/90, 152; 95/218, 228, 270

(56) References Cited

U.S. PATENT DOCUMENTS

| | | | | |
|---|---|---|---|---|
| 926,647 A | * | 6/1909 | Flossel ......................... | 261/90 |
| 1,062,446 A | * | 5/1913 | Ernst ........................... | 96/262 |
| 1,088,188 A | * | 2/1914 | Theisen ........................ | 261/90 |
| 1,342,810 A | * | 6/1920 | Hottmann ..................... | 261/75 |
| 3,235,235 A | | 2/1966 | Umbricht et al. ............. | 261/29 |
| 4,686,940 A | * | 8/1987 | Fullemann ................... | 122/31.1 |
| 5,480,463 A | * | 1/1996 | Hackl ........................... | 96/237 |
| 6,638,343 B1 | * | 10/2003 | Kawamura et al. ........... | 95/218 |
| 6,797,045 B2 | * | 9/2004 | Okuda et al. ................. | 96/282 |

FOREIGN PATENT DOCUMENTS

| | | |
|---|---|---|
| EP | 1 142 621 | 10/2001 |
| EP | 1 310 289 | 5/2003 |
| GB | 1 047 863 | 11/1966 |
| GB | 1 048 921 | 11/1966 |
| GB | 1 157 466 | 7/1969 |
| GB | 1 220 135 | 1/1971 |

OTHER PUBLICATIONS

Copy of PCT Notification of Transmittal of the International Search Report or the Declaration for corresponding PCT Application No. PCT/JP03/02084 including International Search Report dated May 28, 2003.

* cited by examiner

*Primary Examiner*—Scott Bushey
(74) *Attorney, Agent, or Firm*—Westerman, Hattrori, Daniels & Adrian, LLP

(57) ABSTRACT

A scrubber removes dust from an exhaust gas. The scrubber includes a casing having an exhaust gas inlet and an exhaust gas outlet, an impeller housed in the casing and supported by a shaft, and a cleaning liquid supply tube for ejecting a cleaning liquid by which the dust contained in the exhaust gas is captured. The scrubber further includes a plurality of protrusions provided around the impeller such that the exhaust gas and the cleaning liquid which are discharged from the impeller impinge upon the protrusions.

2 Claims, 17 Drawing Sheets

PRIOR ART

PRIOR ART

SCRUBBER AND EXHAUST GAS TREATMENT APPARATUS

BACKGROUND OF THE INVENTION

1. Field of the Invention

The present invention relates to a scrubber and an exhaust gas treatment apparatus for removing dust from an exhaust gas, and more particularly to a scrubber for removing dust from an exhaust gas at a high efficiency, and an exhaust gas treatment apparatus having such a scrubber, a heat exchanger disposed at the downstream side of the scrubber, and other equipment.

2. Description of the Related Art

In a semiconductor fabrication process and a liquid crystal panel fabrication process, an exhaust gas containing silane gas ($SiH_4$) or halogen gas ($NF_3$, $ClF_3$, $SF_6$, $CHF_3$, $C_2F_6$, $CF_4$, or the like) is discharged from fabrication apparatuses in the semiconductor fabrication process and the liquid crystal panel fabrication process. Since the silane and halogen gases are harmful, combustible, or hardly decomposable, the exhaust gas containing such silane and halogen gases cannot be released to the atmosphere as it is. Therefore, it has been customary to use an exhaust gas treatment system in which the exhaust gas is introduced therein and treated to be harmless, and is then released to the atmosphere.

A conventional exhaust gas treatment system is shown in FIG. 16 of the accompanying drawings. As shown in FIG. 16, the conventional exhaust gas treatment system comprises an exhaust gas treatment apparatus 61, and an exhaust gas treatment apparatus 72 disposed downstream of the exhaust gas treatment apparatus 61. The exhaust gas discharged from a semiconductor fabrication apparatus or the like is introduced into the exhaust gas treatment apparatus 61 in the direction indicated by the arrow G. The exhaust gas treatment apparatus 61 comprises a burner 63 and a liquid atomizing area 64. The exhaust gas introduced into the burner 63 is combusted by flames 65 generated in the burner 63, and is thus heated, oxidized and decomposed. Thereafter, the exhaust gas is fed to the liquid atomizing area 64, and is cooled by a coolant 67 sprayed from coolant spray nozzles 66. At this time, a part of dust contained in the exhaust gas is adsorbed by the coolant 67, and is then discharged together with the coolant 67 through a U-shaped drain pipe 68 to the outside of the exhaust gas treatment apparatus 61. The drain pipe 68 comprises a U-shaped pipe storing a liquid therein for discharging only the coolant 67 containing dust without allowing the exhaust gas to pass therethrough. The exhaust gas cooled in the liquid atomizing area 64 is fed to the exhaust gas treatment apparatus 72 through an exhaust gas pipe 17.

The exhaust gas treatment apparatus 72 comprises a scrubber 60, and a mist collector 69 connected to the scrubber 60 and disposed downstream of the scrubber 60. The scrubber 60 has a casing 2 and an impeller 3 housed in the casing 2. The impeller 3 has a number of impeller blades, and is fixed to a driving shaft 4 which is coupled to a motor 16. The impeller 3 is thus rotated by the motor 16 at a high speed. The casing 2 has an exhaust gas inlet 8 at a position near the central portion of the impeller 3. A cleaning liquid supply tube 9 extending into the impeller 3 for ejecting a cleaning liquid 10 is provided through the exhaust gas inlet 8.

The exhaust gas which has been treated by the exhaust gas treatment apparatus 61 is drawn through the exhaust gas pipe 17 and the exhaust gas inlet 8 into the central portion of the impeller 3 by the rotation of the impeller 3. At this time, the cleaning liquid 10 is ejected from the cleaning liquid supply tube 9, and the exhaust gas is stirred together with the cleaning liquid 10 by the rotation of the impeller 3. Dust contained in the exhaust gas is adsorbed and captured by the cleaning liquid 10, and is thus removed from the exhaust gas. The dust adsorbed by the cleaning liquid 10 is discharged together with the cleaning liquid 10 through a U-shaped drain pipe 15 to the outside of the exhaust gas treatment apparatus 72. The cleaning liquid 10 primarily comprises water.

The exhaust gas from which dust has been removed is discharged from the scrubber 60 through an exhaust gas outlet 7 provided at an upper end portion of the casing 2. The exhaust gas discharged through the exhaust gas outlet 7 flows into the mist collector 69 disposed at the downstream side of the exhaust gas outlet 7. Mist contained in the exhaust gas is trapped and collected by the mist collector 69, and the exhaust gas from which the mist has been removed is thus finally released to the atmosphere.

In the conventional exhaust gas treatment system having the above structure, the following problems arise:

1) When the exhaust gas containing silane gas ($SiH_4$) or the like is heated, oxidized and decomposed in the exhaust gas treatment apparatus 61, the treated exhaust gas contains fine dust having a diameter of 1 $\mu$m or less at a high concentration. If the exhaust gas containing such fine dust is scrubbed by the above conventional scrubber, then the dust is removed by a percentage ranging from 20 to 60%, which is a low dust-removal efficiency.

2) In many cases, the conventional mist collector comprises a filling material (SUS, ceramic, plastic, or the like), a metal mesh, a filter, and the like. Since the mist collector has small openings for passing the exhaust gas therethrough, the mist collector tends to be easily clogged by the mist. Consequently, it is necessary to carry out time-consuming cleaning of the mist collector. Further, because a saturated vapor contained in the exhaust gas cannot be trapped by the mist collector, when a temperature of the exhaust gas is lowered after the exhaust gas is passed through the mist collector, the saturated vapor that has passed through the mist collector is changed into mist, thus causing a pipe provided at the downstream side of the mist collector to be clogged by the mist.

There has been known a treatment method in which a gas, to be treated, such as $SiH_4$ which can easily react with water is directly drawn into the scrubber to be made harmless without passing through an exhaust gas treatment apparatus. However, the gas to be treated and water contained in the cleaning liquid attached to the exhaust gas inlet react with each other to produce $SiO_2$, thus causing the exhaust gas inlet to be clogged.

Further, as shown in FIG. 16, in the case where the scrubber 60 is connected to an apparatus having the drain pipe 68 at the downstream side of such apparatus, the following problem arises:

FIG. 17 is a schematic view illustrating the relationship between a liquid level of the drain pipe and the scrubber shown in FIG. 16. In the arrangement shown in FIG. 17, if a suction pressure generated in the exhaust gas pipe 17 by the rotation of the impeller 3 is excessively high, then the liquid level 68b of the drain pipe 68 rises, and hence the exhaust gas pipe 17 is closed by a liquid 68c. On the other hand, if the suction pressure is too low, then the liquid level 68b of the drain pipe 68 is lowered to cause a liquid sealing state to be lost, resulting in a leakage of a gas, to be treated, through a liquid discharge port 68a of the drain pipe 68.

The above problem can be solved by changing an operating condition of the motor 16, i.e., increasing or decreasing the rotational speed of the impeller 3. However, it is preferable to keep the operating condition (the rotational speed) of the motor 16 unchanged in order to prevent an exhaust gas treatment capability of the scrubber 60 from being lowered. Heretofore, therefore, it has been attempted to either provide a restrictor such as a butterfly valve (not shown) at an exhaust gas outlet side of the scrubber 60 or increase a liquid sealing length of the drain pipe 68 to adjust the liquid level 68a.

However, in the case where the restrictor is provided at the exhaust gas outlet side, the restrictor tends to be clogged due to deposition of dust thereon. On the other hand, in the case where the liquid sealing length of the drain pipe 68 is increased, a large area is required for the installation. From such viewpoints, it is problematic to employ these methods. Consequently, it has been customary to solve the above problems by increasing or decreasing the rotational speed of the impeller 3. Specifically, when the suction pressure is too high, the rotational speed of the motor 16 is required to be lowered. As a result, the scrubber 60 has to be operated in such a state that the exhaust gas treatment capability of the scrubber 60 is lowered.

SUMMARY OF THE INVENTION

The present invention has been made in view of the above drawbacks. It is therefore an object of the present invention to provide a scrubber and an exhaust gas treatment apparatus which can enhance a capability of removing fine dust from an exhaust gas, simplify the structure of a mist collector while keeping a required mist-trap capability, prevent a piping system from being clogged, and allow a suction pressure to be adjusted without lowering an exhaust gas treatment capability.

In order to achieve the above object, according to one aspect of the present invention, there is provided a scrubber for removing dust from an exhaust gas, comprising: a casing having an exhaust gas inlet and an exhaust gas outlet; an impeller housed in the casing and supported by a shaft; a cleaning liquid supply tube for ejecting a cleaning liquid by which the dust contained in the exhaust gas is captured; and a plurality of protrusions provided around the impeller such that the exhaust gas and the cleaning liquid which are discharged from the impeller impinge upon the protrusions; wherein positions of side end portions of adjacent two of the protrusions are different from each other in an extending direction of the shaft.

With the above arrangement, the cleaning liquid and the exhaust gas which are discharged from the impeller rotating at a high speed impinge upon the protrusions disposed around the impeller, thus producing a turbulent flow substantially fully around the impeller. The turbulent flow accelerates the mixing action of the cleaning liquid and the exhaust gas, thus making it possible to remove the dust from the exhaust gas at a higher efficiency. When large droplets of the cleaning liquid impinge upon the protrusions, such droplets are converted into smaller droplets which are scattered in the casing. By thus accelerating the conversion of the cleaning liquid into smaller droplets, the dust is adsorbed by the droplets of the cleaning liquid at a high efficiency.

The cleaning liquid that has adsorbed the dust flows through the gaps between the protrusions toward a liquid discharge pipe (drain pipe). Therefore, the amount of the cleaning liquid which flows over the protrusions to impinge upon the impeller is reduced, the resistance to the rotation of the impeller is reduced, and hence the load on the motor is reduced. A part of the cleaning liquid which has captured the dust and has been directed to the liquid discharge pipe is stirred by the impeller rotating at a high speed and converted into small droplets, which are scattered around again. Such small droplets of the cleaning liquid capture the dust contained in the exhaust gas at a higher efficiency, and can thus increase a dust removal efficiency in coactions with the small droplets generated by the above turbulent flow.

According to another aspect of the present invention, there is also provided a scrubber for removing dust from an exhaust gas, comprising: a casing having an exhaust gas inlet and an exhaust gas outlet; an impeller housed in the casing and supported by a shaft; a cleaning liquid supply tube for ejecting a cleaning liquid by which the dust contained in the exhaust gas is captured; a plurality of protrusions provided around the impeller such that the exhaust gas and the cleaning liquid which are discharged from the impeller impinge upon the protrusions; an exhaust gas pipe disposed at the upstream side of the exhaust gas inlet and having a slop inclining downwardly toward the exhaust gas inlet; and a cleaning liquid ejection port for ejecting a cleaning liquid into the exhaust gas pipe.

With the above arrangement, the cleaning liquid such as water is ejected from the cleaning liquid ejection port to remove powdery particles produced by the reaction between liquid remaining in the exhaust gas inlet and the exhaust gas. The cleaning liquid remaining in the exhaust gas inlet after the cleaning is carried out flows down the slope out of the exhaust gas inlet. By thus discharging the liquid remaining in the exhaust gas inlet, even when a gas likely to react with the liquid is directly introduced into the scrubber, the gas does not react with the remaining liquid, and hence the exhaust gas inlet is prevented from being clogged.

In a preferred aspect of the present invention, a clearance between the exhaust gas inlet and the impeller is variable.

If a suction pressure developed in the exhaust gas pipe by the rotation of the impeller is too high, the clearance is increased to lower the suction pressure. If the suction pressure developed in the exhaust gas pipe is too low, the clearance is reduced to increase the suction pressure. Therefore, it is possible to adjust the suction pressure without changing an operating condition, e.g., the rotational speed, of a motor which rotates the impeller, thus keeping a liquid in a U-shaped drain pipe disposed at the upstream side of the exhaust gas inlet at a proper liquid level. As a result, the exhaust gas can be treated by the scrubber without reducing an exhaust gas treatment capability of the scrubber.

According to another aspect of the present invention, there is also provided an exhaust gas treatment apparatus for treating an exhaust gas containing dust, comprising: a scrubber for removing the dust from the exhaust gas; a mist collector provided at the downstream side of the scrubber for trapping and collecting a mist contained in the exhaust gas; and a heat exchanger provided at the downstream side of the mist collector for cooling the exhaust gas to a temperature equal to or lower than a predetermined temperature; wherein the scrubber comprises a casing having an exhaust gas inlet and an exhaust gas outlet, an impeller housed in the casing and supported by a shaft, a cleaning liquid supply tube for ejecting a cleaning liquid by which the dust contained in the exhaust gas is captured, and a plurality of protrusions provided around the impeller such that the exhaust gas and the cleaning liquid which are discharged from the impeller impinge upon the protrusions.

In a preferred aspect of the present invention, the mist collector comprises a baffle board disposed therein for trapping and collecting the mist contained in the exhaust gas.

In the case where the mist collector comprises a plurality of the baffle boards staggered to each other, the exhaust gas flowing into the mist collector is forced to change the flow direction thereof by the baffle boards. Since the mist contained in the exhaust gas cannot change the flow direction thereof and thus impinges upon the baffle boards, the mist in a supersaturated state can reliably be trapped and collected by the mist collector.

If the baffle boards are spaced from each other by a certain distance, then the mist collector is prevented from being clogged by the trapped mist. When the exhaust gas is cooled to a temperature equal to or lower than a predetermined temperature such as an ambient temperature by the heat exchanger, water other than a saturated vapor at the ambient temperature can be trapped. As a result, the pipe is prevented from being clogged by a regenerated mist.

In a preferred aspect of the present invention, the exhaust gas treatment apparatus further comprises a dilution gas supply device for supplying a dilution gas into the exhaust gas at the downstream side of the mist collector or the heat exchanger.

With this arrangement, when the dilution gas is supplied into the exhaust gas, the saturated state of the water in the exhaust gas is lessened, thus making it possible to prevent the mist from being regenerated even when the temperature of the exhaust gas in the downstream region is lowered to a normal temperature.

DETAILED DESCRIPTION OF THE PREFERRED EMBODIMENTS

A first embodiment of the present invention will hereinafter be described with reference to the drawings.

Figure 1:
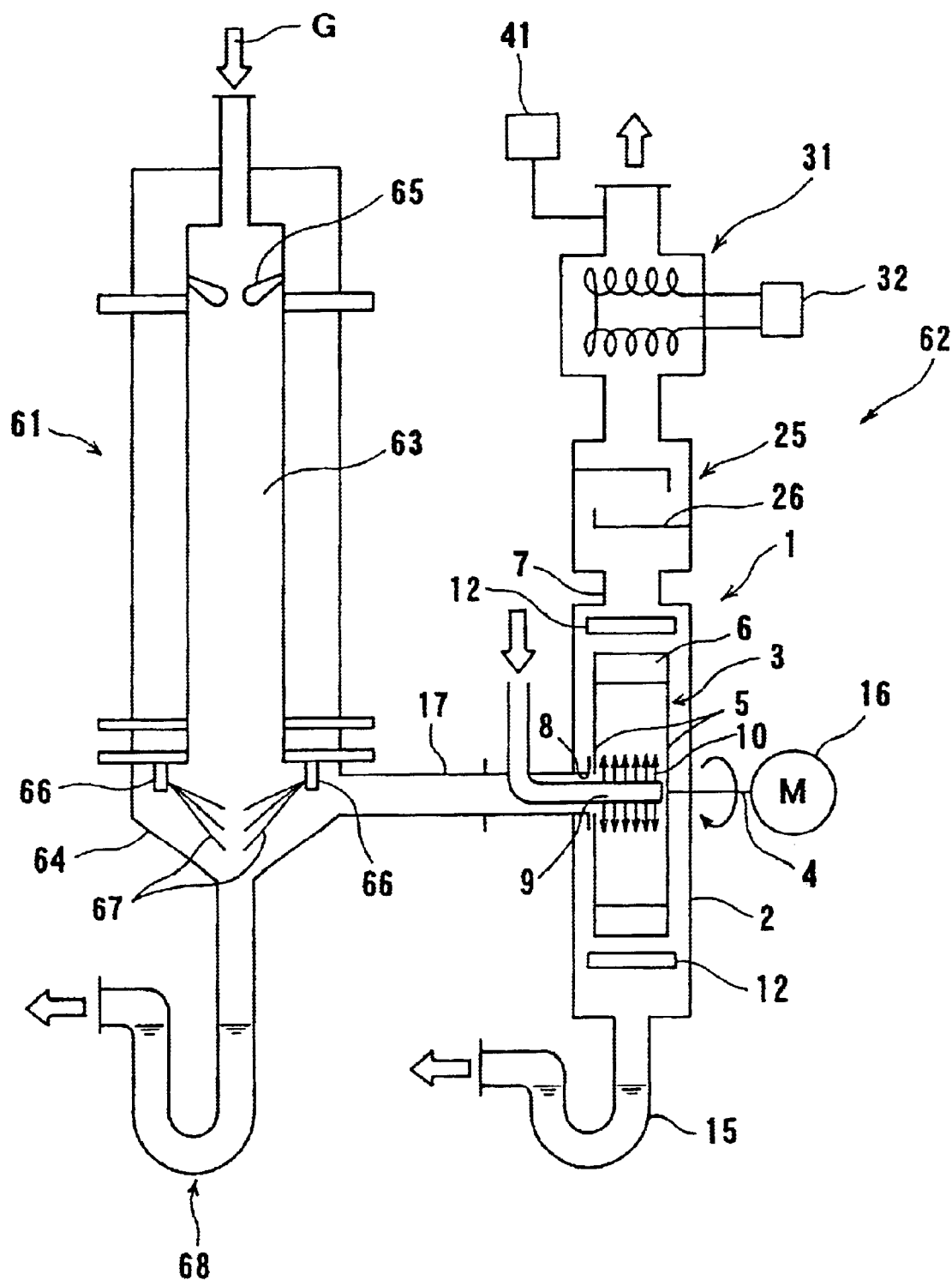
FIG. 1 is a schematic view showing a whole structure of an exhaust gas treatment system having an exhaust gas treatment apparatus according to a first embodiment of the present invention.

As shown in FIG. 1, according to a first embodiment of the present invention, an exhaust gas treatment system comprises an exhaust gas treatment apparatus 61, and an exhaust gas treatment apparatus 62 disposed downstream of the exhaust gas treatment apparatus 61. The exhaust gas treatment apparatus 61 comprises a burner 63 for combusting an exhaust gas, and a liquid atomizing area 64 for cooling the exhaust gas which has been combusted by the burner 63. The exhaust gas treatment apparatus 62 comprises a scrubber 1, a mist collector 25, a heat exchanger 31, and a dilution gas supply device 41. An exhaust gas discharged from a semiconductor fabrication apparatus or the like is introduced into the exhaust gas treatment apparatus 61 in the direction indicated by the arrow G. The exhaust gas fed to the burner 63 is combusted by flames 65 generated in the burner 63 for thereby being heated, oxidized and decomposed. Thereafter, the exhaust gas is fed to the liquid atomizing area 64 in which the exhaust gas is cooled by a coolant 67 sprayed from coolant spray nozzles 66. At this time, the coolant 67 adsorbs a part of dust contained in the exhaust gas, and is discharged through a U-shaped drain pipe 68 to the outside of the exhaust gas treatment apparatus 61. The cooled exhaust gas is fed through an exhaust gas pipe 17 to the exhaust gas treatment apparatus 62.

Figure 2A:
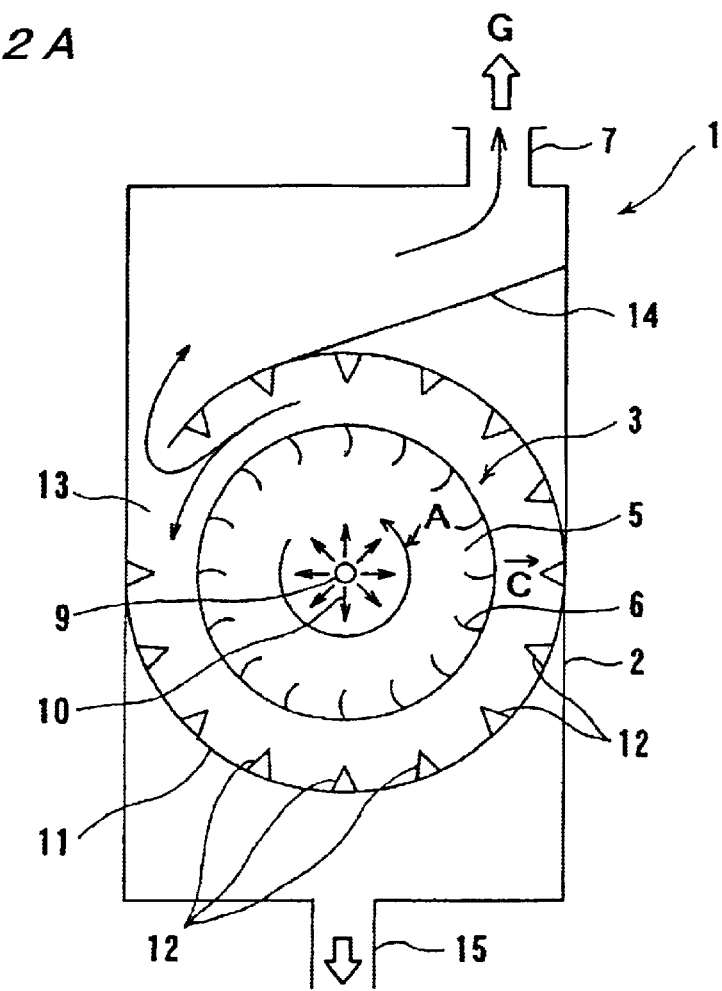
FIG. 2A is a schematic cross-sectional front view showing a scrubber of the exhaust gas treatment apparatus according to the first embodiment of the present invention.

In the exhaust gas treatment apparatus 62, first, the exhaust gas is treated by the scrubber 1. As shown in FIGS. 1 and 2A, the scrubber 1 has a casing 2 and an impeller 3 housed centrally in the casing 2. The impeller 3 is fixed to a driving shaft 4 that is coupled to a motor 16. The impeller 3 comprises a pair of parallel side plates 5, and a plurality of impeller blades 6 provided between the side plates 5 and fixed to the side plates 5. The respective impeller blades 6 are disposed at outer circumferential portions of the side plates 5, and are equally spaced from each other by a predetermined distance in a circumferential direction of the side plates 5.

Figure 5:
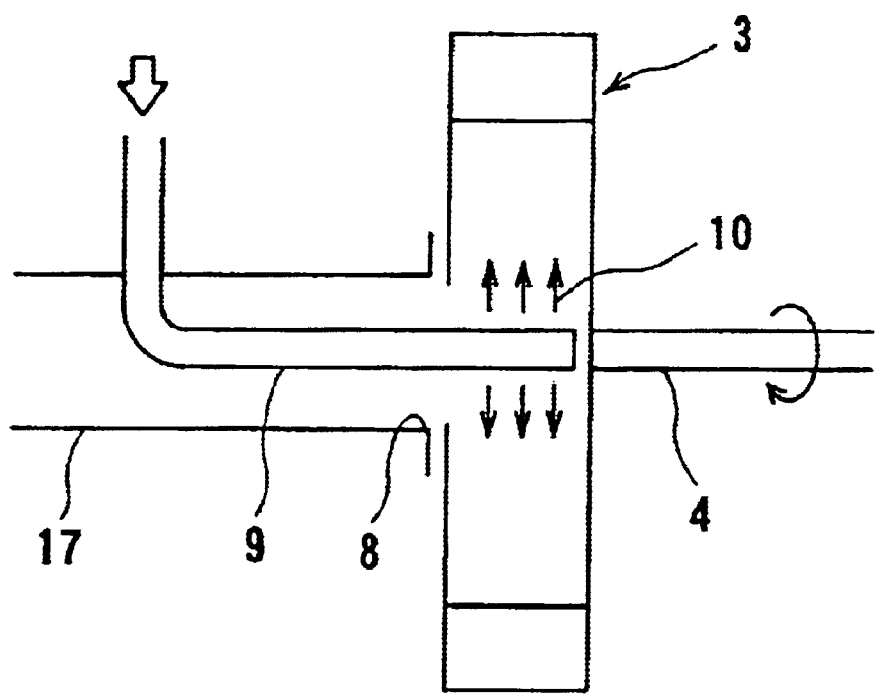
FIG. 5 is a schematic cross-sectional view showing a part of the scrubber of the exhaust gas treatment apparatus according to the first embodiment of the present invention.

The casing 2 has an exhaust gas inlet 8 disposed near the central portion of the impeller 3. With this arrangement, the exhaust gas containing dust is drawn through the exhaust gas inlet 8 into the impeller 3 by the rotation of the impeller 3. As shown in FIG. 1, a cleaning liquid supply tube 9 extending into the impeller 3 for ejecting a cleaning liquid 10 is provided through the exhaust gas inlet 8. The cleaning liquid supply tube 9 has a plurality of ejection ports (not shown) which open at the inside of the impeller 3, and hence, as shown in FIG. 5, the cleaning liquid 10 is ejected from the ejection ports toward an outer circumferential portion of the impeller 3. The cleaning liquid 10 mainly comprises water.

Figure 2B:
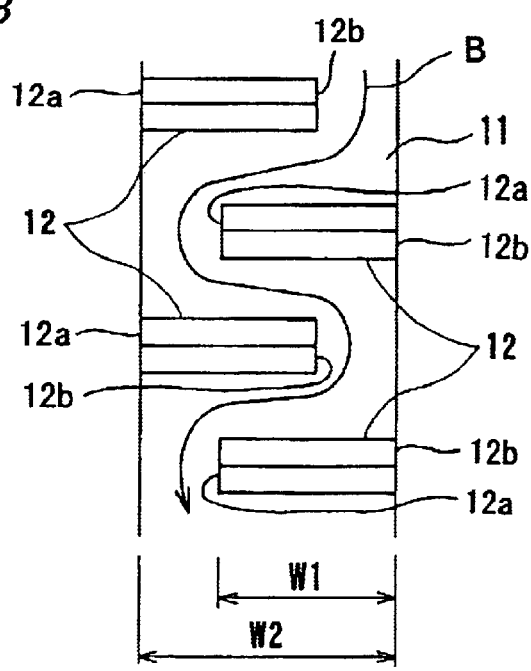
FIG. 2B is a view showing the scrubber as viewed in the direction indicated by the arrow II in FIG. 2A.

As shown in FIG. 2A, a circular baffle plate 11 is provided so as to enclose the impeller 3 substantially entirely. The baffle plate 11 is spaced radially outwardly from the outer circumferential portion of the impeller 3 by a predetermined distance. A plurality of protrusions 12 are fixed to an inner surface (facing the impeller 3) of the baffle plate 11. The respective protrusions 12 have a triangular cross section and a predetermined length in the axial direction of the impeller 3. The protrusions 12 are disposed at equal intervals along a circumferential direction of the baffle plate 11. As shown in FIG. 2B, the protrusions 12 have the longitudinal length W1 smaller than the width W2 of the baffle plate 11. A side end portion 12a of the protrusion 12 is positioned corresponding to an edge of the baffle plate 11, and an opposite side end portion 12b of an adjacent protrusion 12 is positioned corresponding to an opposite edge of the baffle plate 11. With this arrangement, the protrusions 12 are aligned in such a manner that positions of the end portions 12a of the adjacent two of the protrusions 12 are alternately different from each other in an extending direction of the driving shaft 4. Specifically, the protrusions 12 are staggered in a circumferential direction of the baffle plate 11. Therefore, the inner surface of the baffle plate 11 has alternately exposed areas between inner ends of the protrusions 12 and the edges of the baffle plate 11. As a result, a zigzag path for the cleaning liquid 10, formed by portions where the protrusions 12 are not provided, is defined on the inner surface of the baffle plate 11.

Figure 3A:
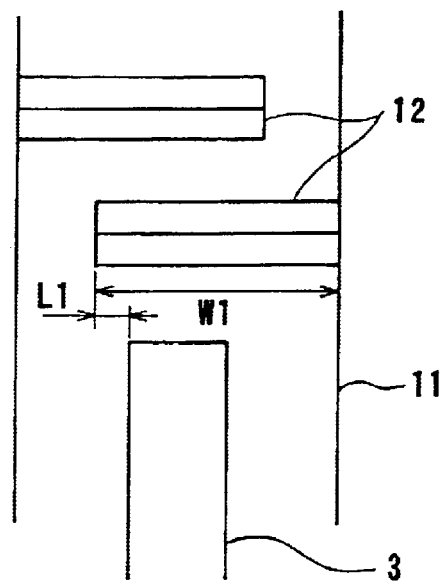
FIGS. 3A and 3B are schematic views illustrating the dimensional relationship between an impeller and a protrusion according to the first embodiment of the present invention.
Figure 3B:
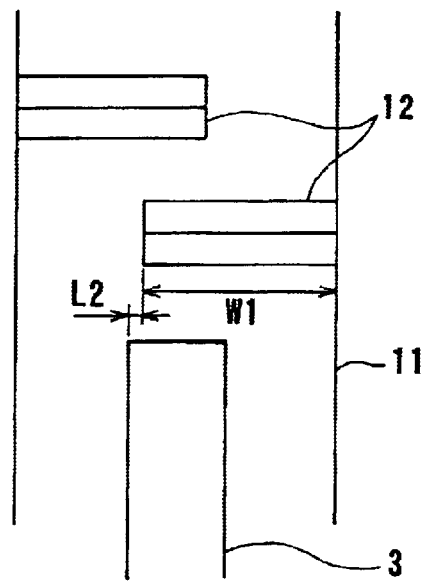

FIGS. 3A and 3B show the dimensional relationship between the length W1 of the protrusions 12, the width W2 of the baffle plate 11, and the width W3 of the impeller 3. The relationship between the length W1 of the protrusions 12 and the width W2 of the baffle plate 11 can be defined in a manner as shown in FIGS. 3A and 3B. Specifically, as shown in FIG. 3A, the inner ends of the protrusions 12 may be positioned beyond the impeller 3. Alternately, as shown in FIG. 3B, the inner ends of the protrusions 12 may be positioned between both side edges of the impeller 3. The width W2 of the baffle plate 11 should preferably be 1 to 5 times the width W3 of the impeller 3. In FIG. 3A, the inner ends of the protrusions 12 should preferably be spaced from the side edge of the impeller 3 by a distance L1 which is about 0 to 2 times the width W3 of the impeller 3. In FIG. 3B, the inner ends of the protrusions 12 should preferably be spaced from the side edge of the impeller 3 by a distance L2 which is about 0 to 0.5 times the width W3 of the impeller 3.

As shown in FIG. 2A, the baffle plate 11 having a substantially cylindrical shape has a gap or an opening defined therein and serving as an exhaust gas exit opening 13. A slanted plate 14 is provided near a top portion of the baffle plate 11, and extends obliquely upwardly toward the casing 2. The casing 2 has an exhaust gas outlet 7 defined in an upper end portion thereof above the slanted plate 14.

Figure 4:
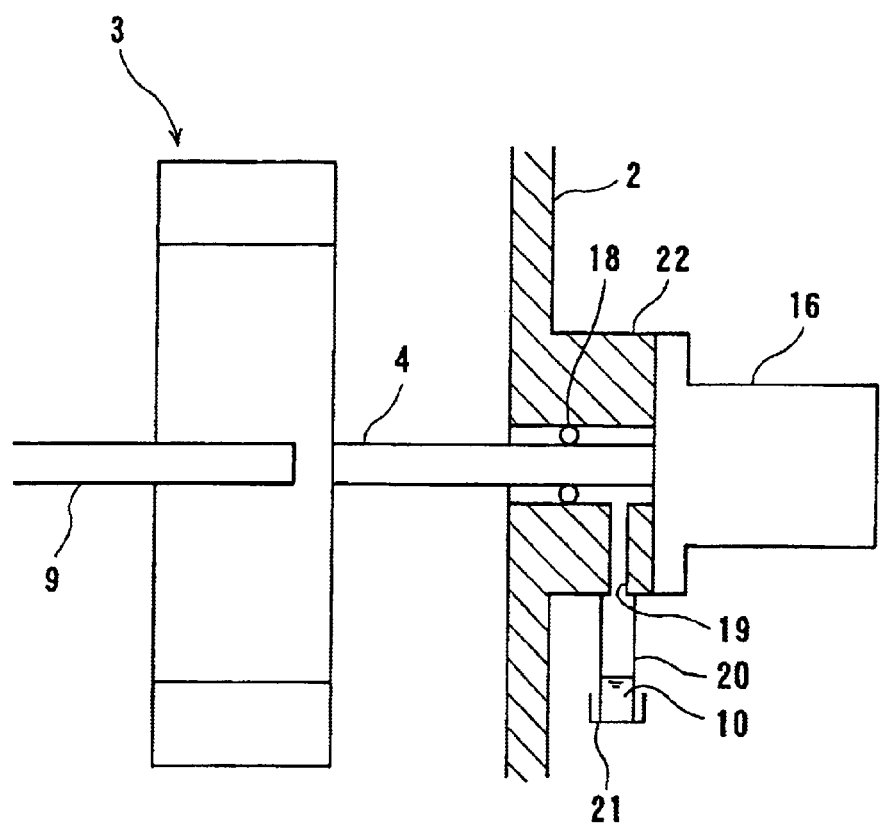
FIG. 4 is a schematic cross-sectional view showing a part of the scrubber of the exhaust gas treatment apparatus according to the first embodiment of the present invention.

As shown in FIG. 4, the motor 16 is mounted on the casing 2 through a base 22 having a shaft seal 18 disposed between the motor 16 and the casing 2 for preventing the cleaning liquid 10 from leaking toward the motor side. A drain port 19 is defined in the base 22 between the shaft seal 18 and the motor 16. The any cleaning liquid 10 that has leaked through the shaft seal 18 toward the motor side flows into the drain port 19, thus preventing the cleaning liquid 10 from flowing into the motor 16. Further, a transparent tube (transparent container) 20 extending downwardly is connected to a lower end portion of the drain port 19. A valve 21 is attached to a lower end portion of the transparent tube 20, so that the cleaning liquid 10 that has flowed through the drain port 19 is stored in the transparent tube 20 or drained from the transparent tube 20.

Since the any cleaning liquid 10 that has leaked through the shaft seal 18 is led into the drain port 19, no cleaning liquid 10 reaches the motor 16, thus preventing the motor 16 from an operation failure due to the entry of the cleaning liquid 10. Further, because the cleaning liquid 10 that has flowed through the drain port 19 is stored in the transparent tube 20, an operator can easily determine the remaining service life of the shaft seal 18 by visually checking the amount of the cleaning liquid 10 stored in the transparent tube 20. The transparent tube 20 thus serves as a leakage check device for checking the amount of a cleaning liquid that has leaked through the shaft seal 18. The shaft seal in the present embodiment should preferably comprise a shaft seal mechanism using a magnetic fluid, a labyrinth seal, an oil seal, or the like. The transparent tube 20 may be replaced with a liquid leakage sensor for checking the amount of the leaked cleaning liquid 10.

Next, an operation of the exhaust gas treatment system according to the present invention will be described below. In FIG. 2A, the impeller 3 is rotated by the motor 16 at a high speed in the direction indicated by the arrow A. The rotational speed of the impeller 3 should preferably be in the range from 3600 to 7200 rpm ($min^{-1}$). When the impeller 3 is rotated, the exhaust gas containing dust is drawn through the exhaust gas pipe 17 and the exhaust gas inlet 8 into the impeller 3. At this time, as shown in FIGS. 2A and 5, the cleaning liquid 10 is ejected from the cleaning liquid supply tube 9. The exhaust gas and the cleaning liquid 10 are stirred and mixed together by the rotation of the impeller 3, and hence the dust contained in the exhaust gas is adsorbed by the atomized cleaning liquid 10. The cleaning liquid 10 which has adsorbed the dust is collected on a bottom portion of the casing 2, and is then discharged through a U-shaped drain pipe 15.

The cleaning liquid 10 and the exhaust gas are discharged outwardly from the outer circumferential portion of the impeller 3 under centrifugal force exerted by the impeller 3 rotating at a high speed, and impinge upon the protrusions 12, thus producing a turbulent flow. The turbulent flow accelerates the mixing action of the cleaning liquid 10 and the exhaust gas, thus making it possible to remove the dust from the exhaust gas highly efficiently. Because the cleaning liquid 10 impinges upon the protrusions 12 to be pulverized or atomized, the dust is removed from the exhaust gas at a higher efficiency.

As shown in FIG. 2B, the cleaning liquid 10 which has adsorbed dust flows down the baffle plate 11 in the direction indicated by the arrow B along the zigzag path defined by the protrusions 12 on the baffle plate 11. Therefore, the protrusions 12 having the shape and dimension as described above can prevent the cleaning liquid 10 from flowing over the protrusions 12, and hence prevent the cleaning liquid 10 from impinging upon the impeller 3 again. Accordingly, it is possible to reduce the resistance to the rotation of the impeller 3, and hence the load on the motor 16 can be reduced.

The exhaust gas from which the dust has been removed flows upwardly from the exhaust gas exit opening 13 along the slanted plate 14 to the exhaust gas outlet 7, and then flows into the mist collector 25 (see FIG. 1) where a next process is carried out. As shown in FIG. 1, two baffle boards 26 are disposed in the mist collector 25. Respective forward ends of the baffle boards 26 are bent, so that the baffle boards 26 have an L-shaped cross section. The baffle boards 26 are spaced from each other by a predetermined distance and staggered relatively to each other. The exhaust gas flowing into the mist collector 25 changes its flow direction by the baffle boards 26, and is passed, through the mist collector 25. On the other hand, the mist contained in the exhaust gas impinges upon the baffle boards 26 because the mist cannot change its flow direction, thus being trapped and collected by the baffle boards 26.

The exhaust gas which has flowed out of the mist collector 25 flows into the heat exchanger 31 where a next process is carried out. The heat exchanger 31 comprises a refrigerator 32 therein for cooling the exhaust gas to a temperature equal to or lower than an ambient temperature around the heat exchanger 31. Since the exhaust gas is cooled to a temperature equal to or lower than the ambient temperature by the refrigerator 32, it is possible to liquidize and trap a saturated vapor contained in the exhaust gas, which is otherwise unable to be trapped. The exhaust gas which has been discharged from the heat exchanger 31 is diluted by a dilution gas supplied from the dilution gas supply device 41. Thus, the saturated state in the exhaust gas is lessened, and the exhaust gas is then discharged to the atmosphere.

A scrubber according to a second embodiment of the present invention will be described below with reference to FIGS. 6A through 6C. Structural and operational details of the scrubber according to the second embodiment which will not be described below are identical to those of the scrubber according to the first embodiment.

Figure 6A:
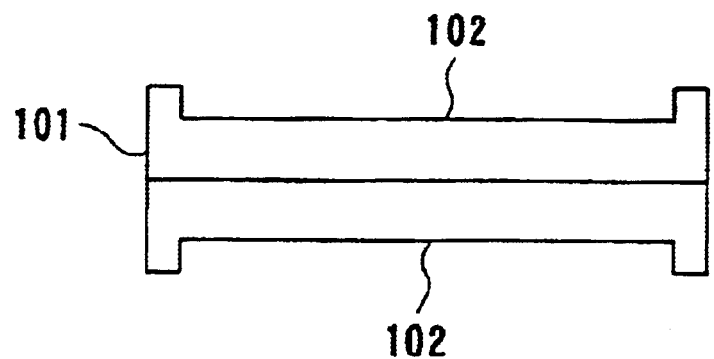
FIGS. 6A, 6B, and 6C are views showing a protrusion used in a scrubber according to a second embodiment of the present invention, FIG. 6A being a plan view, FIG. 6B being a front view, and FIG. 6C being a perspective view.
Figure 6B:
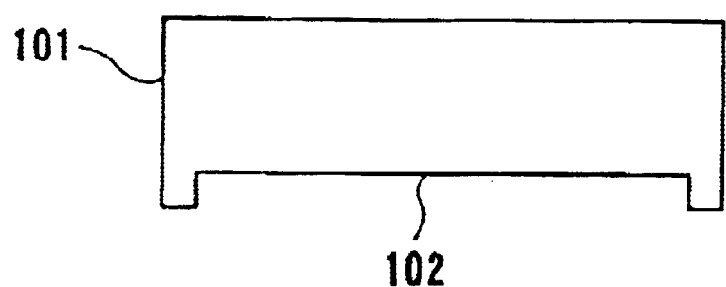
Figure 6C:
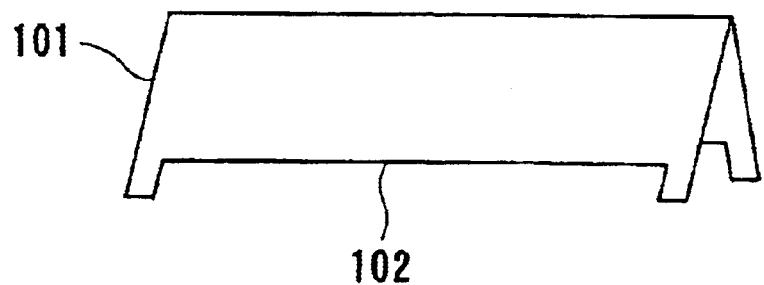

As shown in FIGS. 6A through 6C, a protrusion 101 has notches 102 in opposing lower edges thereof at joint portions where the protrusion 101 and the baffle plate 11 are joined together. The notches 102 provide a path on the inner surface of the baffle plate 11 for allowing the cleaning liquid 10 to pass therethrough, in addition to the zigzag path described above in the first embodiment. As a result, the cleaning liquid 10 is prevented from flowing over the protrusions 12 and prevented from impinging upon the impeller 3 again, thus reducing the resistance to the rotation of the impeller 3 and hence lowering the load on the motor 16.

A scrubber according to a third embodiment of the present invention will be described below with reference to FIGS. 7A and 7B. Structural and operational details of the scrubber according to the third embodiment which will not be described below are identical to those of the scrubber according to the first embodiment.

Figure 7A:
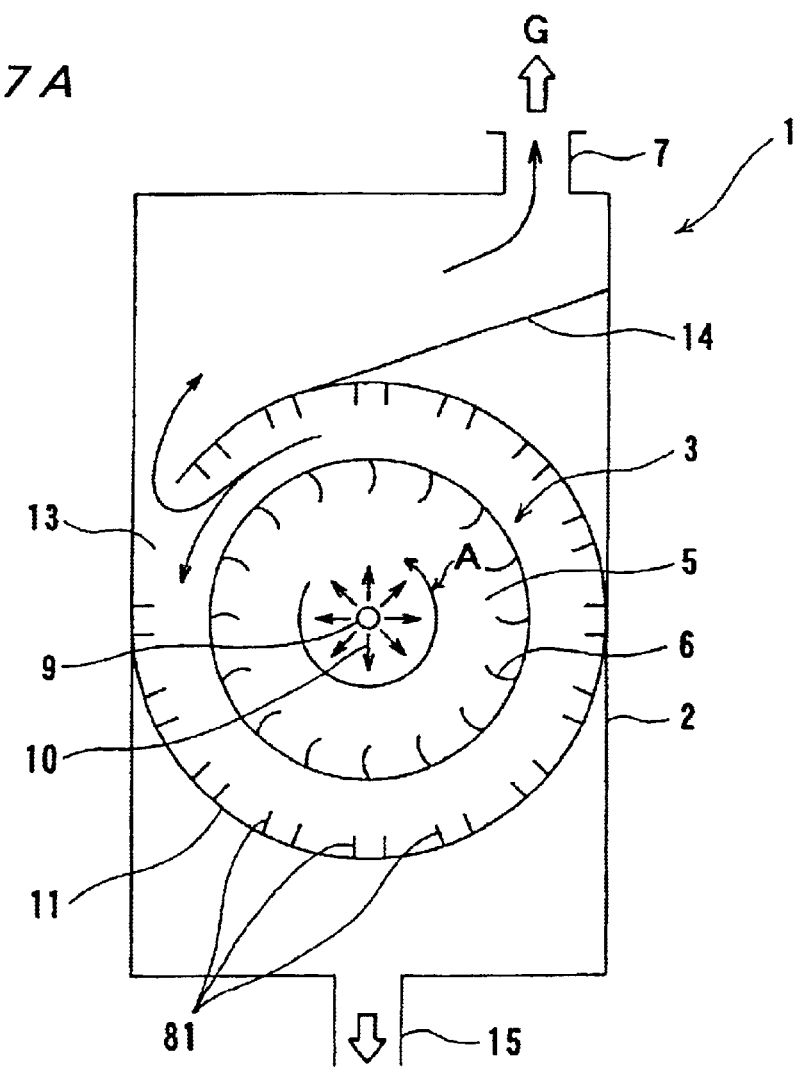
FIG. 7A is a schematic cross-sectional front view showing a scrubber according to a third embodiment of the present invention.
Figure 7B:
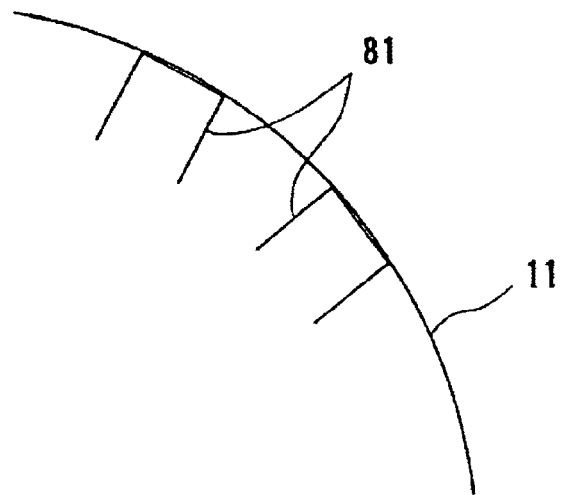
FIG. 7B is an enlarged schematic view showing a portion of the scrubber according to the third embodiment of the present invention.

As shown in FIGS. 7A and 7B, a plurality of protrusions 81 which has two parallel walls and a bottom wall connecting to the parallel walls are provided on the baffle plate 11. The bottom walls of the protrusions 81 are fixed to the inner surface of the baffle plate 11, so that the parallel walls extend radially inwardly toward the central portion of the impeller 3.

In the third embodiment, as with the first embodiment, the cleaning liquid and the exhaust gas discharged outwardly from the impeller 3 impinge upon the protrusions 81, thus producing a turbulent flow. The turbulent flow accelerates the mixing action of the cleaning liquid 10 and the exhaust gas, thus making it possible to remove dust from the exhaust gas at a higher efficiency.

Figure 8:
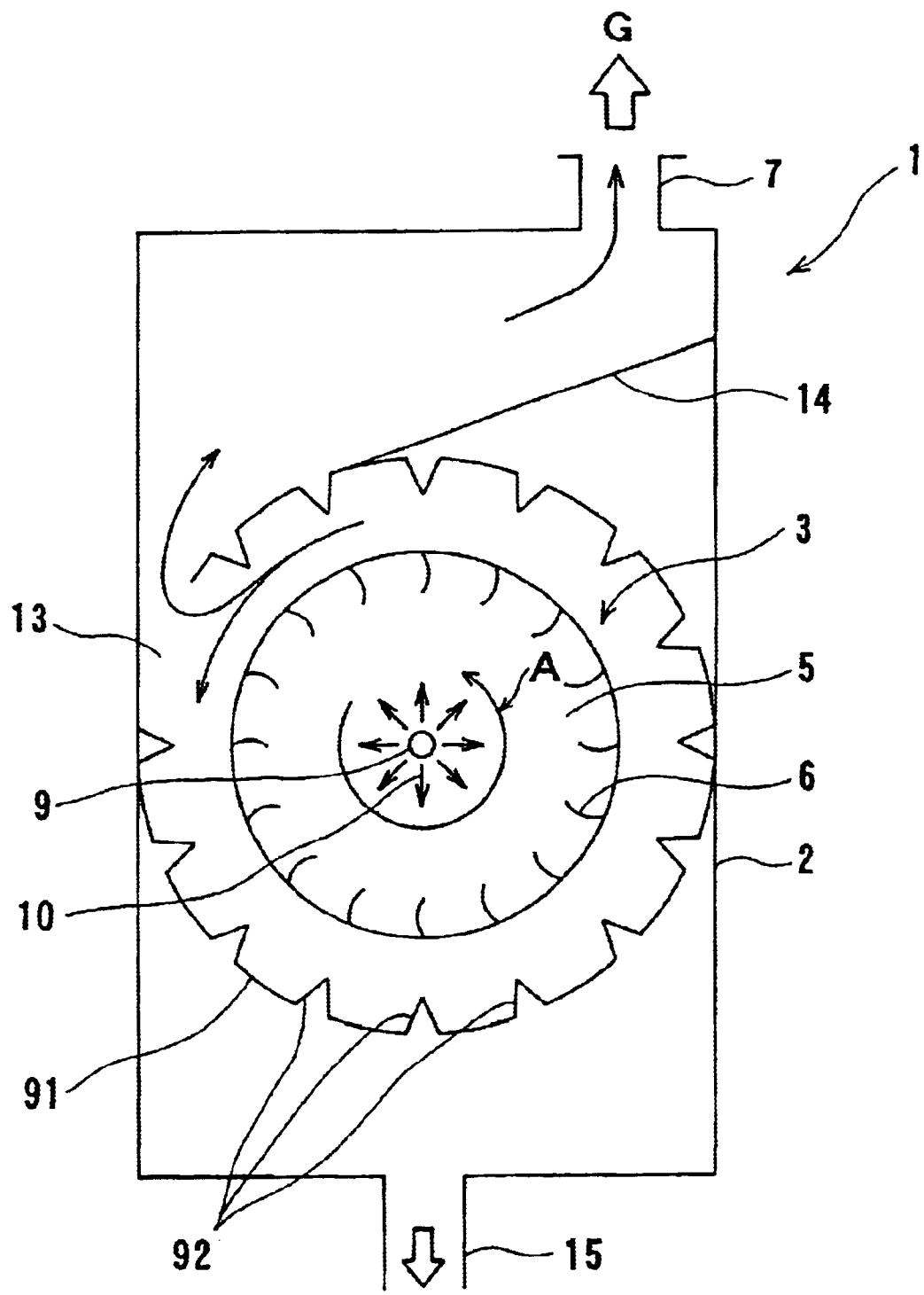
FIG. 8 is a schematic cross-sectional front view showing a scrubber according to a fourth embodiment of the present invention.

A scrubber according to a fourth embodiment of the present invention will be described below with reference to FIG. 8. Structural and operational details of the scrubber according to the fourth embodiment which will not be described below are identical to those of the scrubber according to the first embodiment.

A protrusion formation member 91 is provided in the casing 2 so as to enclose the impeller 3 substantially entirely, and is spaced radially outwardly from the outer circumferential portion of the impeller 3 by a predetermined distance. The protrusion formation member 91 has a plurality of protrusions 92 having a triangular cross section and projecting radially inwardly toward the impeller 3. The protrusions 92 are located at the same positions where the protrusions 12 are fixed to the baffle plate 11 in the first embodiment. The protrusions 92 are formed in the protrusion formation member 91 by press-forming.

In the fourth embodiment, as with the first embodiment, the cleaning liquid 10 and the exhaust gas discharged outwardly from the impeller 3 impinge upon the protrusions 92, thus producing a turbulent flow. The turbulent flow accelerates the mixing action of the cleaning liquid 10 and the exhaust gas, thus making it possible to remove the dust from the exhaust gas at a higher efficiency.

A scrubber according to a fifth embodiment of the present invention will be described below with reference to FIGS. 9A and 9B. Structural and operational details of the scrubber according to the fifth embodiment which will not be described below are identical to those of the scrubber according to the first embodiment.

Figure 9A:
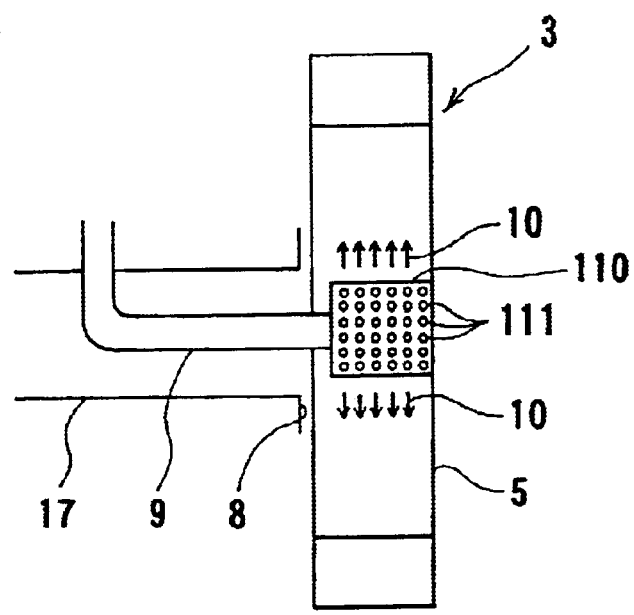
FIG. 9A is a schematic cross-sectional view showing a part of a scrubber according to a fifth embodiment of the present invention.
Figure 9B:
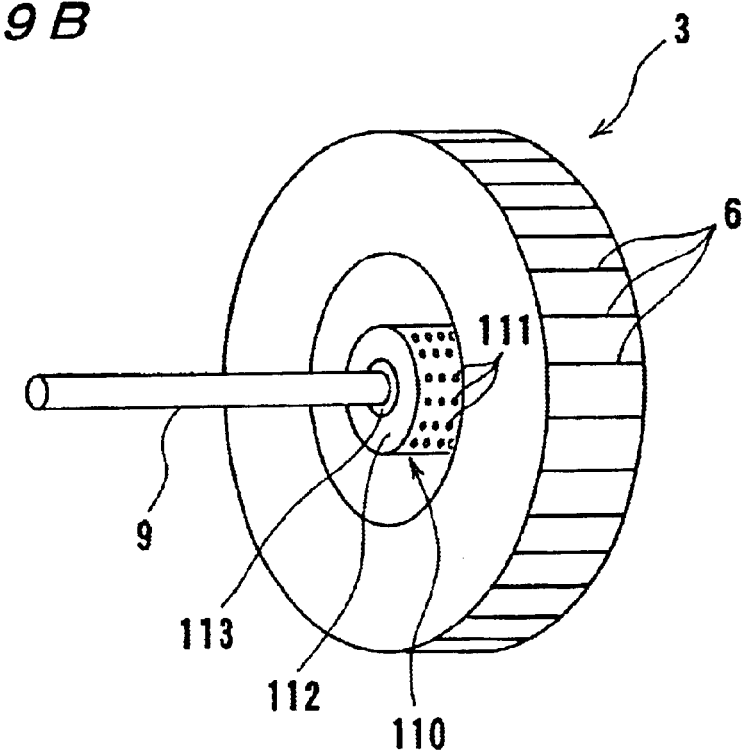
FIG. 9B is a schematic perspective view showing a part of the scrubber according to the fifth embodiment of the present invention.

As shown in FIGS. 9A and 9B, a cylindrical cleaning liquid discharge nozzle 110 is disposed in a covering relation to a distal end of the cleaning liquid supply tube 9. The cylindrical cleaning liquid discharge nozzle 110 is fixed to the impeller 3 in coaxial alignment with the driving shaft 4, and is rotated together with the impeller 3. One open end of the cylindrical cleaning liquid discharge nozzle 110 is fixed to and closed by one of the side plates 5 of the impeller 3, and the other open end of the cylindrical cleaning liquid discharge nozzle 110 is closed by a cover 112. The cover 112 has a tube insertion hole 113 defined centrally therein, and the cleaning liquid supply tube 9 for ejecting the cleaning liquid 10 is inserted in the tube insertion hole 113. The cylindrical cleaning liquid discharge nozzle 110 has a number of small holes 111 defined in an outer circumferential wall thereof for passing the cleaning liquid 10 that has been ejected from the cleaning liquid supply tube 9 therethrough.

According to the present embodiment, when the impeller 3 is rotated at a high speed, the cylindrical cleaning liquid discharge nozzle 110 is also rotated at a high speed. At this time, the cleaning liquid 10 ejected from the cleaning liquid supply tube 9 into the cylindrical cleaning liquid discharge nozzle 110 passes through the small holes 111, and is thus formed into small droplets which are scattered in the impeller 3. The small droplets of the cleaning liquid 10 efficiently trap the fine dust contained in the exhaust gas to be treated. Further, the cover 112 can prevent the cleaning liquid 10 ejected into the cylindrical cleaning liquid discharge nozzle 110 from leaking axially out of the cylindrical cleaning liquid discharge nozzle 110.

A scrubber according to a sixth embodiment of the present invention will be described below with reference to FIG. 10.

Figure 10:
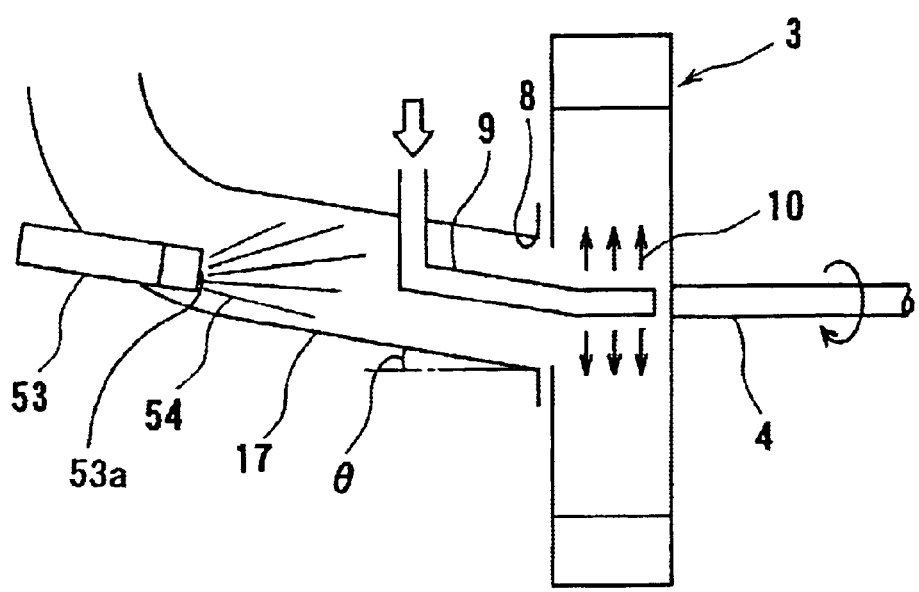
FIG. 10 is a schematic cross-sectional view showing a part of a scrubber according to a sixth embodiment of the present invention.

As shown in FIG. 10, the exhaust gas pipe 17 has a slope inclining downwardly toward the exhaust gas inlet 8 at an angle θ to horizontal which preferably ranges from 0.2 to 60° C. In the same manner as the first embodiment, the cleaning liquid supply tube 9 extending into the impeller 3 for ejecting the cleaning liquid 10 is disposed in the exhaust gas pipe 17. The cleaning liquid supply tube 9 has a plurality of ejection ports (not shown) positioned inside of the impeller 3, and the cleaning liquid 10 is ejected through the ejection ports. A cleaning nozzle 53 having cleaning liquid ejection ports 53a for intermittently ejecting a cleaning liquid 54 such as water into the exhaust gas pipe 17 is provided in the exhaust gas pipe 17 at the upstream side of the cleaning liquid supply tube 9. Other structural details of the scrubber according to the present embodiment are identical to those of the scrubber according to the first embodiment.

Because the exhaust gas pipe 17 has the slope, even if water contained in the cleaning liquid 10 ejected from the cleaning liquid supply tube 9 is attached to the inner surface of the exhaust gas inlet 8, such water flows down the slope and is drained out of the exhaust gas inlet 8. Further, the cleaning liquid 54 intermittently ejected from the cleaning nozzle 53 removes powder particles produced by the reaction between water remaining in the exhaust gas inlet 8 and the exhaust gas. In this manner, since no water remains in the exhaust gas inlet 8, even if a gas, to be treated, likely to react with water is introduced directly into the scrubber 1 to be made harmless without being introduced into the exhaust gas treatment apparatus 61, the exhaust gas inlet 8 can be prevented from being clogged because of no reaction of the exhaust gas with water.

A scrubber according to a seventh embodiment of the present invention will be described below with reference to FIG. 11. Structural and operational details of the scrubber according to the seventh embodiment which will not be described below are identical to those of the scrubber according to the first embodiment.

Figure 11:
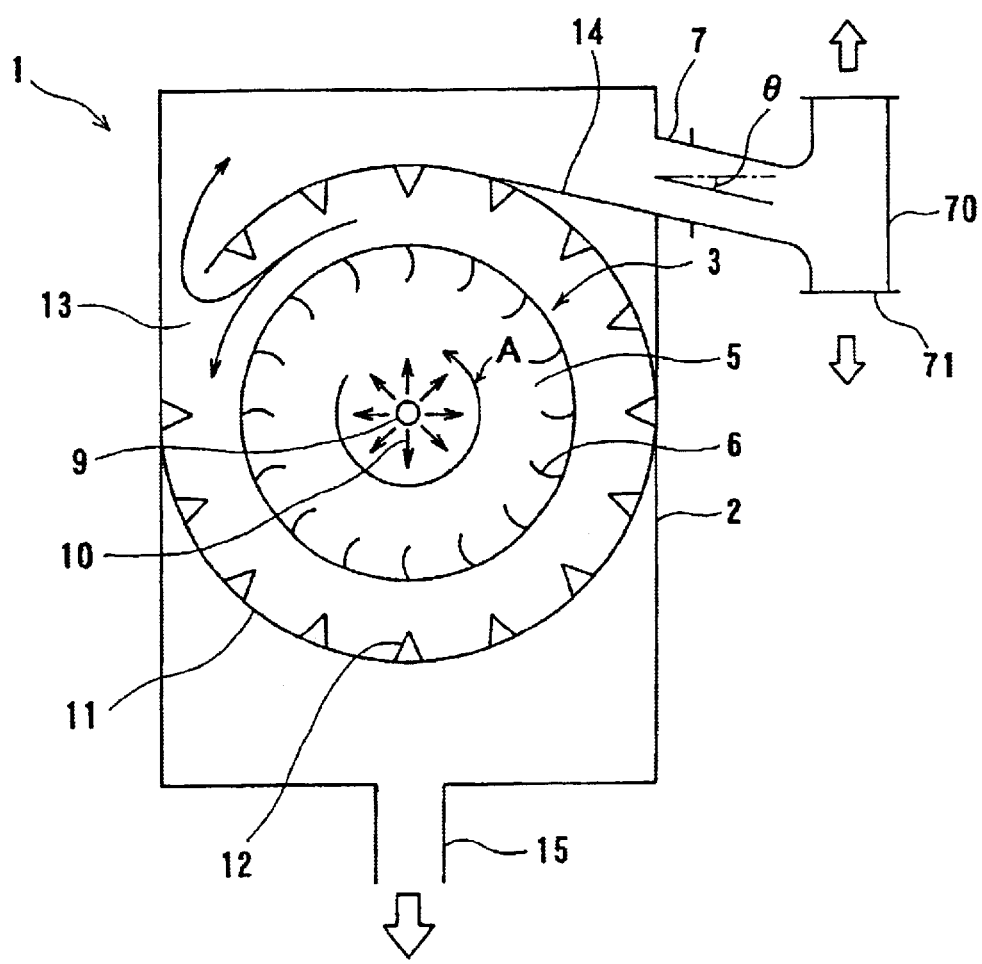
FIG. 11 is a schematic cross-sectional front view showing a scrubber according to a seventh embodiment of the present invention.

As shown in FIG. 11, an exhaust gas outlet 7 is connected to a side wall of the casing 2 at a location radially outwardly of the impeller 3. A slanted plate 14 is provided near the top portion of the baffle plate 11, and extends obliquely downwardly toward the exhaust gas outlet 7. A pipe 70 connected to the exhaust gas outlet 7 for connecting the scrubber 1 and the mist collector 25 (see FIG. 1) has a liquid drain port 71. The pipe 70 has a slope inclining in such a manner that the liquid drain port 71 is located in a lowermost position. An angle θ of the slope to horizontal is preferably in the range of 0.2 to 90° C.

With the above structure, even if water collected by the mist collector 25 and the heat exchanger 31 flows toward the scrubber 1, the water is drained through the liquid drain port 71, and thus does not flow into the scrubber 1. Therefore, the resistance to the rotation of the impeller 3 is prevented from being increased due to the increased amount of water in the casing 2, and hence the load on the motor 16 is prevented from being increased.

A scrubber according to an eighth embodiment of the present invention will be described below with reference to FIG. 12. Structural and operational details of the scrubber according to the eighth embodiment which will not be described below are identical to those of the scrubber according to the first embodiment.

Figure 12:
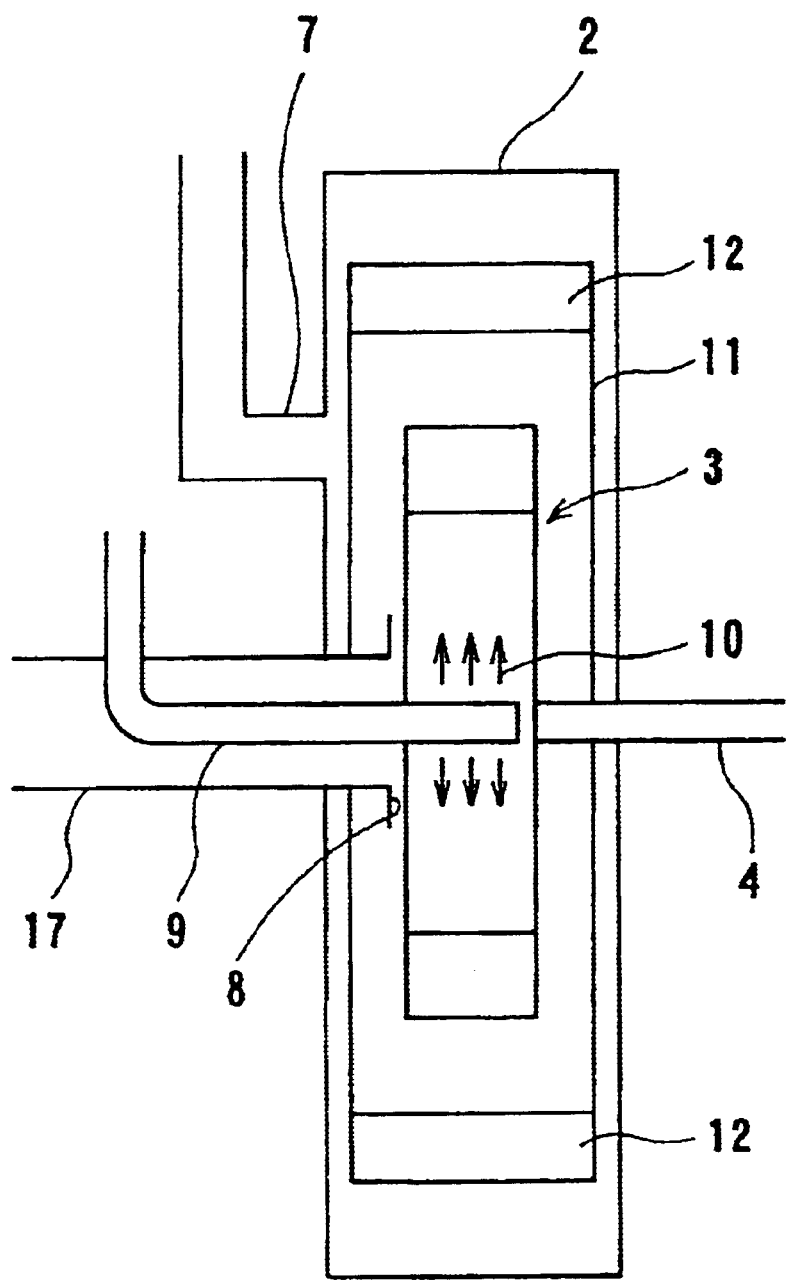
FIG. 12 is a schematic cross-sectional view showing a scrubber according to an eighth embodiment of the present invention.

As shown in FIG. 12, the exhaust gas outlet 7 is connected to a side wall of the casing 2 at a position perpendicular to the impeller 3 in an axial direction of the impeller 3. Since the exhaust gas outlet 7 is thus positioned, even if the water collected by the mist collector 25 and the heat exchanger 31 flows into the scrubber 1, such water does not directly impinge upon the rotating impeller 3. Therefore, the resistance to the rotation of the impeller 3 is prevented from being increased due to the water in the casing 2, and hence the load on the motor 16 is prevented from being increased.

A scrubber according to a ninth embodiment of the present invention will be described below with reference to FIGS. 13, 14A, and 14B. Structural and operational details of the scrubber according to the ninth embodiment which will not be described below are identical to those of the scrubber according to the first embodiment.

Figure 13:
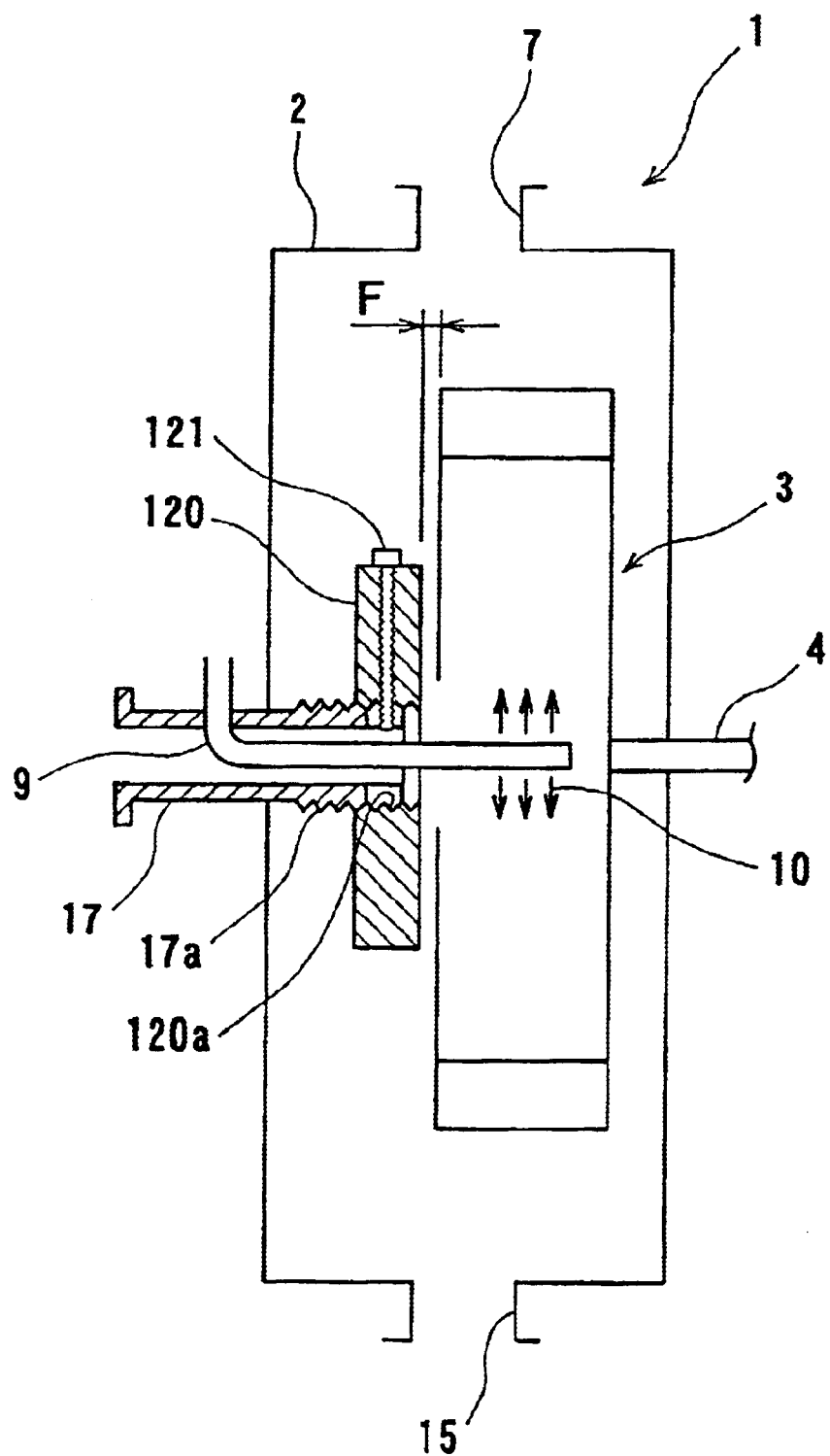
FIG. 13 is a schematic cross-sectional view showing a scrubber according to a ninth embodiment of the present invention.
Figure 14A:
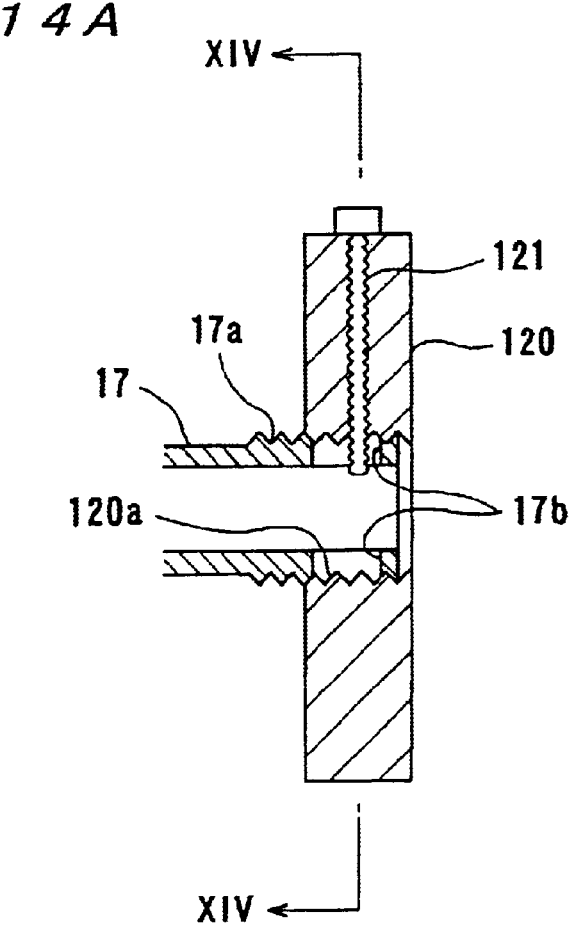
FIG. 14A is an enlarged cross-sectional view showing a part of the scrubber according to the ninth embodiment of the present invention.
Figure 14B:
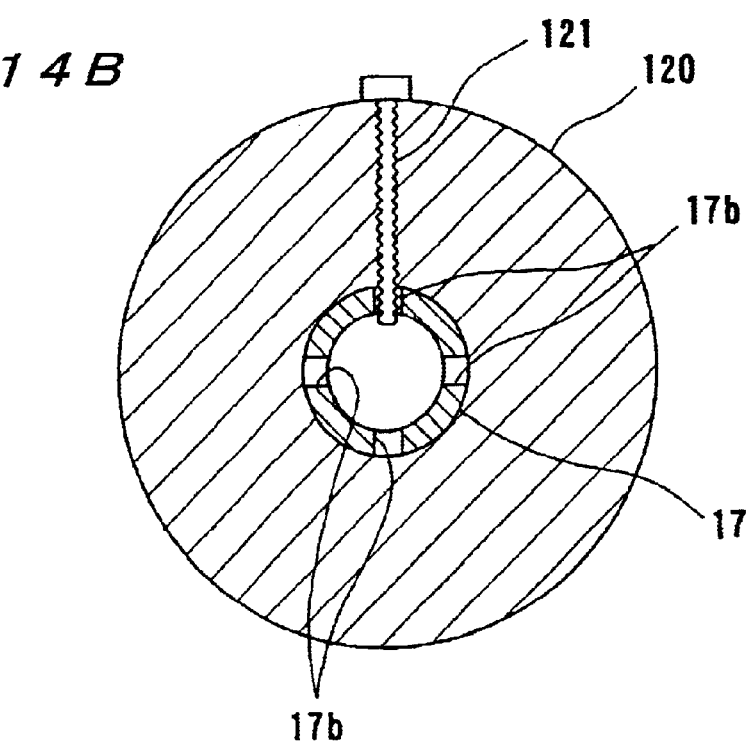
FIG. 14B is an enlarged cross-sectional view taken along line XIV—XIV of FIG. 14A.

As shown in FIGS. 13, 14A, and 14B, a suction-pressure adjustment ring 120 having a thick disk shape is attached to an end portion of the exhaust gas pipe 17. The suction-pressure adjustment ring 120 has a female screw portion 120a formed in an inner circumferential surface thereof. A male screw portion 17a is formed in an outer circumferential surface of the exhaust gas pipe 17. The male screw portion 17a of the exhaust gas pipe 17 is screwed into the female screw portion 120a of suction-pressure adjustment ring 120, so that the suction-pressure adjustment ring 120 can move in the longitudinal direction of the exhaust gas pipe 17. As shown in FIGS. 14A and 14B, the exhaust gas pipe 17 has four slots 17b defined therein at a position where the male screw portion 17a is formed. The slots 17b are arranged at circumferentially equally spaced intervals and extend in the longitudinal direction of the exhaust gas pipe 17. A set screw 121 is screwed into the suction-pressure adjustment ring 120 so as to allow a tip end of the set screw 121 to be fitted into one of the slots 17b of the exhaust gas pipe 17. The suction-pressure adjustment ring 120 serves as an exhaust gas inlet.

In the above structure, an operation of changing the clearance F between the exhaust gas inlet (the suction-pressure adjustment ring 120) and the impeller 3 is carried out as follows:

First, the set screw 121 is loosened, and the suction-pressure adjustment ring 120 is turned to move to a desired position through a screw mechanism comprising the male screw portion 17a and the female screw portion 120a. Then, the set screw 121 is screwed to bring its tip end into one of the slots 17b, thus securing in position of the suction-pressure adjustment ring 120. Even if the set screw 121 is fitted into the slot 17b with a certain clearance therebetween, the suction-pressure adjustment ring 120 is prevented from being turned. In this manner, it is possible to adjust the clearance F in increments of a one-quarter of a pitch of the screw mechanism comprising the male screw portion 17a and the female screw portion 120a. For fine adjustment of the clearance F, it is preferable to form the pitch of the male screw portion 17a and the female screw portion 120a as small as possible, and also preferable to form the slots 17b as many as possible, for example, four to eight slots 17b in the exhaust gas pipe 17.

Figure 17:
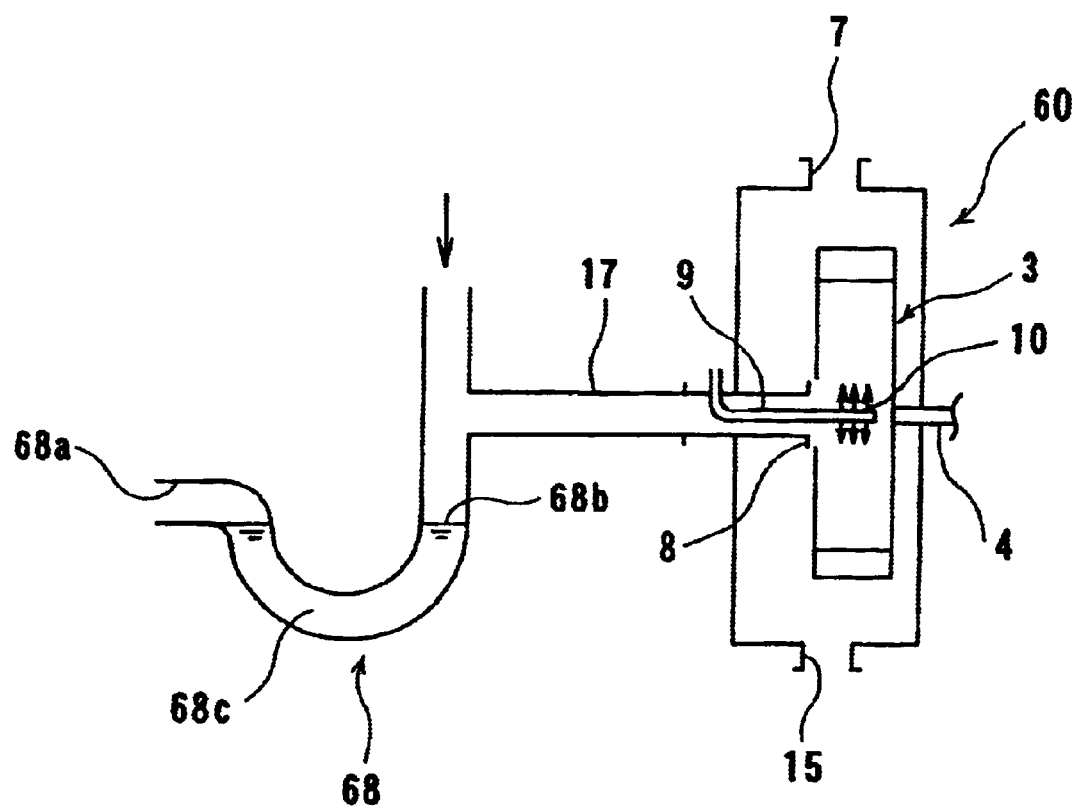
FIG. 17 is a schematic view showing the relationship between a liquid level of a U-shaped drain pipe and a scrubber shown in FIG. 16.

According to the ninth embodiment, it is possible to adjust the suction pressure developed by the rotation of the impeller 3 by changing the clearance F. Specifically, if the suction pressure is high, then the clearance F is increased, and if the suction pressure is low, then the clearance F is reduced to adjust the liquid level 68b of the drain pipe 68 (see FIG. 17). Therefore, the liquid 68c in the drain pipe 68 can be maintained at a proper liquid level without changing the operating condition (the rotational speed) of the motor 16 (see FIG. 1), and hence the exhaust gas can be treated without reducing a treatment capability of the scrubber 1.

A scrubber according to a tenth embodiment of the present invention will be described below with reference to FIG. 15. Structural and operational details of the scrubber according to the tenth embodiment which will not be described below are identical to those of the scrubber according to the first embodiment.

Figure 15:
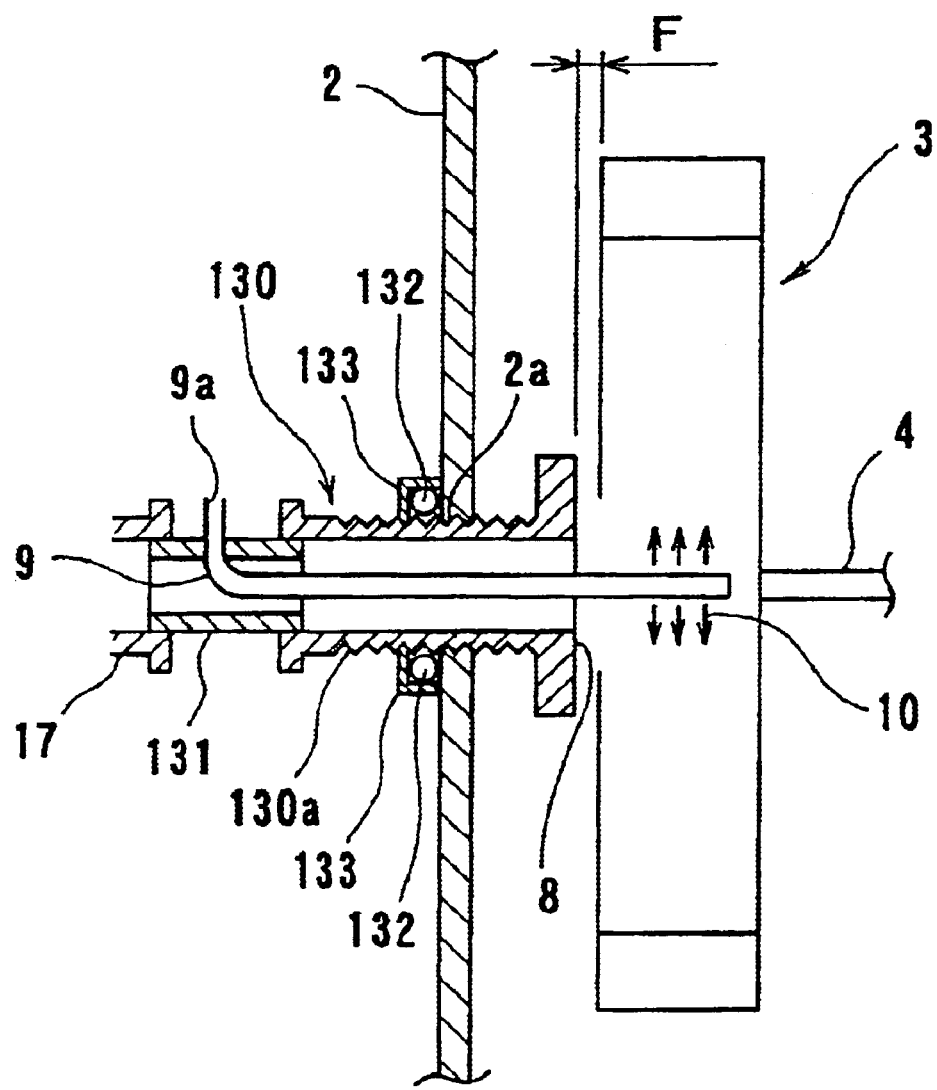
FIG. 15 is a schematic cross-sectional view showing a scrubber according to a tenth embodiment of the present invention.
Figure 16:
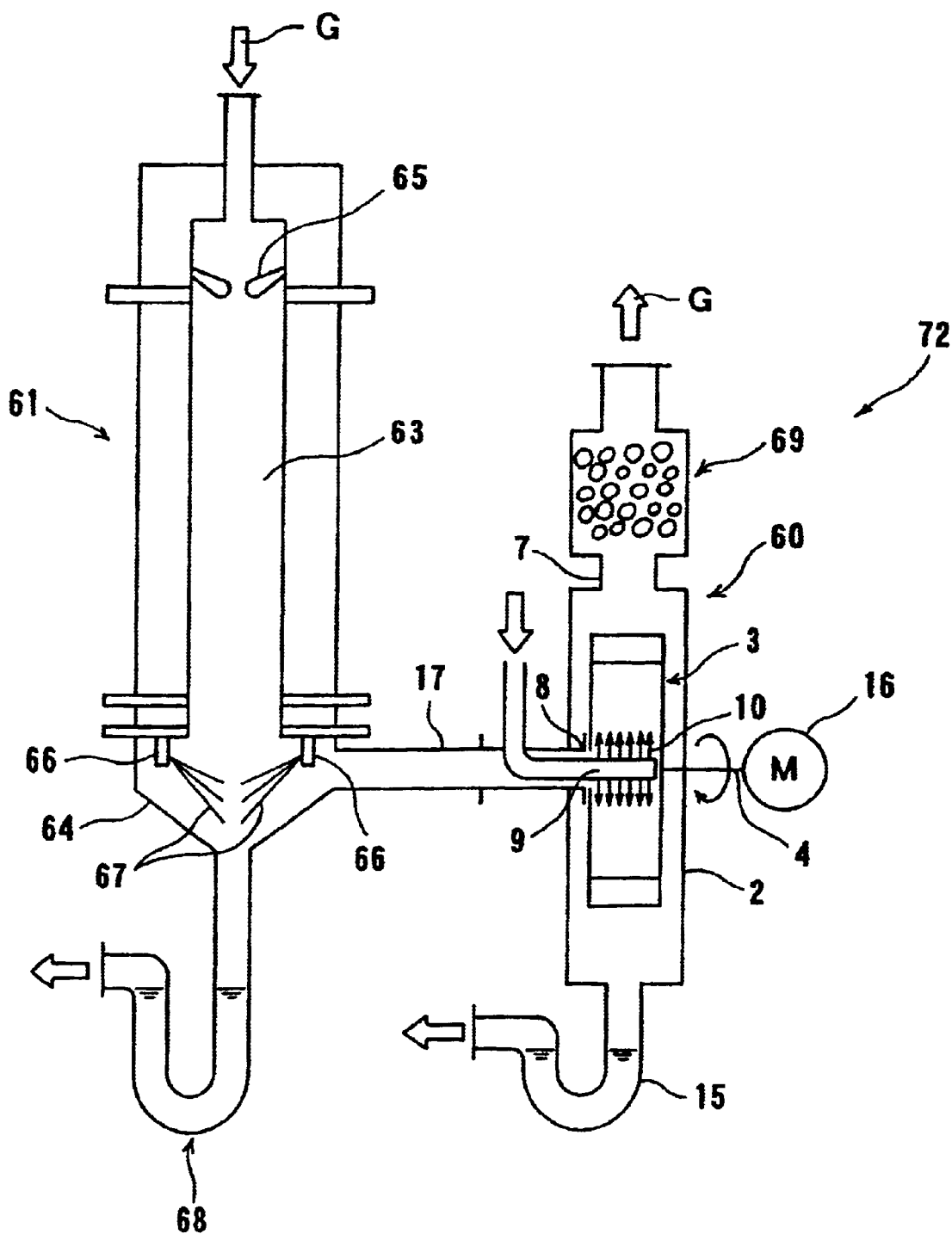
FIG. 16 is a schematic view showing a conventional exhaust gas treatment system.

As shown in FIG. 15, a cylindrical exhaust gas inlet pipe 130 is provided on the side wall of the casing 2. The exhaust gas inlet pipe 130 has a male screw portion 130a formed on an outer circumferential surface thereof. The casing 2 has a female screw portion 2a in the side wall of the casing 2. The male screw portion 130a of the exhaust gas inlet pipe 130 is screwed into the female screw portion 2a of the casing 2 for thereby allowing the exhaust gas inlet pipe 130 to move perpendicularly to the side wall of the casing 2. The exhaust gas inlet pipe 130 has an exhaust gas inlet 8 defined in an end portion thereof close to the impeller 3 and having a thick disk shape. The other end of the exhaust gas inlet pipe 130 is connected to the exhaust gas pipe 17 through a nozzle pipe 131.

A seal member 132 for preventing a gas to be treated from leaking toward the outside of the casing 2 is provided on a screwed portion where the male screw portion 130a of the exhaust gas inlet pipe 130 is screwed into the female screw portion 2a of the casing 2. The seal member 132 is fixed to the side wall of the casing 2 by a seal holder 133. The cleaning liquid supply tube 9 is connected to the nozzle pipe 131 fitted into the exhaust gas inlet pipe 130.

In the above structure, an operation of changing the clearance F between the exhaust gas inlet 8 and the impeller 3 is carried out as follows:

The exhaust gas inlet pipe 130 exposed out of the casing 2 is turned to move to a desired position through a screw mechanism comprising the male screw portion 130a and the female screw portion 2a. Since the exhaust gas inlet pipe 130 and the nozzle pipe 131 are simply fitted to each other, only the exhaust gas inlet pipe 130 can be turned without turning the nozzle pipe 131. Therefore, even when the exhaust gas inlet pipe 130 is turned to change its position, a cleaning liquid inlet 9a of the cleaning liquid supply tube 9 fixed to the nozzle pipe 131 can be kept in its original position. For fine adjustment of the clearance F, it is preferable to form a pitch of the male screw portion 130a and the female screw portion 2a as small as possible.

According to the tenth embodiment, it is possible to adjust the suction pressure developed by the rotation of the impeller 3 by changing the clearance F. Specifically, if the suction pressure is high, then the clearance F is increased, and if the suction pressure is low, then the clearance F is reduced to adjust the liquid level 68b of the drain pipe 68 (see FIG. 17). Therefore, the liquid 68c in the drain pipe 68 can be maintained at a proper liquid level without changing the operating condition (the rotational speed) of the motor 16 (see FIG. 1), and hence the exhaust gas can be treated without reducing the treatment capability of the scrubber 1. Further, because the clearance F can be changed without disassembling the scrubber 1, the suction pressure can be adjusted with utmost ease.

According to the present invention, the protrusions provided in the scrubber can accelerate the production of small droplets of the cleaning liquid which are scattered in the casing, thereby removing dust contained in the exhaust gas at a higher efficiency. The protrusions are alternately staggered to allow the cleaning liquid to flow smoothly toward the liquid discharge pipe, thus reducing the load on the motor.

Since the mist collector has the baffle boards, the mist contained in the exhaust gas can be trapped and collected without causing the mist collector to be clogged by the mist. Further, because the exhaust gas is cooled by the heat exchanger and is supplied with a dilution gas, the pipe is prevented from being clogged, thus ensuring the operational safety.

The exhaust gas pipe having the slop and the cleaning liquid ejection port can prevent the exhaust gas inlet from being clogged even when a gas likely to react with water is introduced.

Inasmuch as the clearance between the exhaust gas inlet and the impeller is variable, the suction pressure can be adjusted without changing the operating condition, such as the rotational speed, of the motor, even if the drain pipe is provided at the upstream side of the scrubber. As a result, the liquid of the drain pipe disposed at the upstream side of the exhaust gas inlet can be maintained at a proper liquid level, and hence the exhaust gas can be treated without reducing a treatment capability of the scrubber.

The present invention is applicable to a scrubber capable of removing dust from an exhaust gas at a high efficiency, and an exhaust gas treatment apparatus having such a scrubber, a heat exchanger disposed at the downstream side of the scrubber, and the like.

What is claimed is:

1. An exhaust gas treatment apparatus for treating an exhaust gas containing dust, comprising:

a scrubber for removing the dust from the exhaust gas;

a mist collector provided at the downstream side of said scrubber for trapping and collecting a mist contained in the exhaust gas; and a heat exchanger provided at the downstream side of said mist collector for cooling the exhaust gas to a temperature equal to or lower than a predetermined temperature;

wherein said scrubber comprises a casing having an exhaust gas inlet and an exhaust gas outlet, an impeller housed in said casing and supported by a shaft, a cleaning liquid supply tube for ejecting a cleaning liquid by which the dust contained in the exhaust gas is captured, and a plurality of protrusions provided around said impeller such that the exhaust gas and the cleaning liquid which are discharged from said impeller impinge upon said protrusions;

and further comprising a dilution gas supply device for supplying a dilution gas into the exhaust gas at the downstream side of said mist collector or said heat exchanger.

2. An exhaust gas treatment apparatus according to claim 1, wherein said mist collector comprises a baffle board disposed therein for trapping and collecting the mist contained in the exhaust gas.

* * * * *